US011376967B2

(12) United States Patent
Nakata et al.

(10) Patent No.: US 11,376,967 B2
(45) Date of Patent: Jul. 5, 2022

(54) VEHICLE BRAKE DEVICE

(71) Applicants: ADVICS CO., LTD., Kariya (JP); TOYOTA JIDOSHA KABUSHIKI KAISHA, Toyota (JP)

(72) Inventors: Daisuke Nakata, Seto (JP); Kosuke Hashimoto, Kariya (JP); Kenji Sakamoto, Shizuoka-ken (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 732 days.

(21) Appl. No.: 16/324,086

(22) PCT Filed: Jul. 19, 2017

(86) PCT No.: PCT/JP2017/026044
§ 371 (c)(1),
(2) Date: Feb. 7, 2019

(87) PCT Pub. No.: WO2018/030083
PCT Pub. Date: Feb. 15, 2018

(65) Prior Publication Data
US 2019/0176628 A1   Jun. 13, 2019

(30) Foreign Application Priority Data
Aug. 10, 2016  (JP) .............................. JP2016-157251

(51) Int. Cl.
*B60L 7/26*    (2006.01)
*B60T 8/17*    (2006.01)
(Continued)

(52) U.S. Cl.
CPC ................... *B60L 7/26* (2013.01); *B60L 7/24* (2013.01); *B60T 8/17* (2013.01); *B60T 13/165* (2013.01);
(Continued)

(58) Field of Classification Search
CPC .... B60T 8/17; B60T 13/586; B60T 2270/604; B60L 7/24; B60L 7/26; B60W 30/18127; B60W 10/188; B60W 1/192
See application file for complete search history.

(56) References Cited

U.S. PATENT DOCUMENTS 5,511,859 A  *  4/1996  Kade ..................... B60K 6/442
                                                    303/3
8,931,856 B2    1/2015  Okano et al.
(Continued)

FOREIGN PATENT DOCUMENTS

JP    2005329740 A  *  12/2005
JP    2008013061 A  *   1/2008  ............... B60L 7/18
(Continued)

OTHER PUBLICATIONS

EPO machine translation of JP 2010-167971 (original JP document published Aug. 5, 2010) (Year: 2010).*
(Continued)

*Primary Examiner* — David A Testardi
(74) *Attorney, Agent, or Firm* — Buchanan Ingersoll & Rooney PC

(57) ABSTRACT

This vehicle brake device performs raising processing for raising, by a predetermined raising amount, the target hydraulic pressure of hydraulic fluid when the pressure of the hydraulic fluid starts increasing in order to suppress a delay in response to the increase in the pressure of hydraulic fluid during switching processing for gradually switching at least part of regenerative braking force to hydraulic braking force, and includes a judging portion which judges whether or not required braking force or deceleration is reduced during cooperative control; and a raising amount setting portion which during the raising processing, sets a second predetermined pressure as a raising amount if the judgement result of the judging portion is positive, the second prede-
(Continued)

termined pressure being smaller than a first predetermined pressure that is the raising amount when the determination result of the determination result is negative.

5 Claims, 5 Drawing Sheets

(51) Int. Cl.
| | |
|---|---|
| B60W 20/14 | (2016.01) |
| B60W 10/192 | (2012.01) |
| B60L 7/24 | (2006.01) |
| B60W 10/08 | (2006.01) |
| B60W 10/18 | (2012.01) |
| B60W 10/188 | (2012.01) |
| B60T 13/16 | (2006.01) |
| B60T 13/58 | (2006.01) |

(52) U.S. Cl.
CPC ......... *B60T 13/586* (2013.01); *B60W 10/08* (2013.01); *B60W 10/18* (2013.01); *B60W 10/188* (2013.01); *B60W 10/192* (2013.01); *B60W 20/14* (2016.01); *B60T 2270/10* (2013.01); *B60T 2270/30* (2013.01); *B60T 2270/604* (2013.01)

(56) References Cited

U.S. PATENT DOCUMENTS

| 9,688,151 | B2 | 6/2017 | Okano et al. | |
|---|---|---|---|---|
| 2004/0122579 | A1* | 6/2004 | Ashizawa | G07C 5/08 701/70 |
| 2007/0228821 | A1* | 10/2007 | Maki | B60L 7/26 303/151 |
| 2007/0228822 | A1* | 10/2007 | Hirata | B60L 50/40 303/151 |
| 2010/0161193 | A1* | 6/2010 | Piel | B60T 8/4275 701/78 |
| 2010/0270854 | A1* | 10/2010 | Okano | B60T 1/10 303/3 |
| 2011/0285198 | A1* | 11/2011 | Nakata | B60W 10/184 303/3 |
| 2012/0007417 | A1* | 1/2012 | Matsushita | B60T 1/10 303/3 |
| 2012/0074768 | A1* | 3/2012 | Naito | B60L 7/14 303/3 |
| 2013/0049449 | A1* | 2/2013 | Watanabe | B60T 8/4063 303/3 |
| 2014/0195133 | A1* | 7/2014 | Kato | B60W 20/00 701/78 |
| 2015/0202964 | A1* | 7/2015 | Nefcy | B60L 7/18 701/70 |
| 2015/0266458 | A1* | 9/2015 | Okano | B60T 11/16 303/3 |
| 2015/0352960 | A1* | 12/2015 | Okano | B60T 8/172 701/70 |
| 2016/0039292 | A1* | 2/2016 | Takahashi | B60W 30/18109 701/70 |
| 2016/0264002 | A1* | 9/2016 | Suda | B60T 8/17616 |
| 2016/0325628 | A1* | 11/2016 | Okano | B60W 30/18109 |
| 2017/0137031 | A1* | 5/2017 | Yamaguchi | B60L 15/2009 |
| 2017/0297452 | A1* | 10/2017 | Cho | B60L 7/18 |
| 2018/0264949 | A1* | 9/2018 | Kaneko | B60L 15/2009 |
| 2018/0272872 | A1* | 9/2018 | Okano | B60T 8/4077 |

FOREIGN PATENT DOCUMENTS

| JP | 2008179259 A | * | 8/2008 | ............ B60T 8/267 |
|---|---|---|---|---|
| JP | 2009154600 A | | 7/2009 | |
| JP | 2010167971 A | * | 8/2010 | ............ B60L 50/16 |
| JP | 2010167972 A | * | 8/2010 | |
| JP | 2013124054 A | * | 6/2013 | ............ B60L 50/16 |
| JP | 2014012429 A | * | 1/2014 | ............ B60T 8/267 |
| JP | 2014073708 A | * | 4/2014 | ............ B60L 7/18 |
| JP | 2015093586 A | * | 5/2015 | |
| JP | 2015229489 A | | 12/2015 | |
| JP | 2017065345 A | * | 4/2017 | ............ B60T 8/3205 |
| JP | 2018024326 A | * | 2/2018 | ......... B60L 15/2009 |
| WO | 2009081270 A1 | | 7/2009 | |

OTHER PUBLICATIONS

EPO machine translation of JP 2018-24326A (original JP document published Feb. 15, 2018) (Year: 2018).*
International Search Report (with English translation) and Written Opinion issued in corresponding International Patent Application No. PCT/JP2017, 7 pages (dated Oct. 24, 2017).

* cited by examiner

VEHICLE BRAKE DEVICE

TECHNICAL FIELD

This invention relates to a vehicle brake device.

BACKGROUND ART

In a vehicle brake device equipped with a regeneration brake device and a hydraulic pressure brake device, a cooperative control is executed so that the sum of the regeneration braking force and the hydraulic pressure braking force follows a required braking force. In the vehicle brake device, a switching processing is executed, wherein at least a portion of the regeneration braking force gradually switches over to the hydraulic pressure braking force when the vehicle is under braking operation and is running at a low speed. In this switching processing, a delay in response may be generated depending on the control characteristics of the hydraulic pressure brake device, such as setting of the dead zone and such delay in response may influence on a brake feeling of the driver of the vehicle. Therefore, for example, in JP2015-229489 A, a vehicle brake device is proposed in which a raising processing for raising the target hydraulic pressure is executed at the timing of the switching processing to suppress the response delay.

CITATION LIST

Patent Literature

Patent Literature 1 JP2015-229489 A

SUMMARY OF INVENTION

Technical Problem(s)

When such raising processing is executed, a pressure increasing control is executed in which a pressure increasing inclination is steeper than a normal pressure increasing control so that the control-subject hydraulic pressure (actual hydraulic pressure) catches up with the raised target hydraulic pressure. Accordingly, when a pressure decreasing control is executed after execution of such pressure increasing control, the timing of actual pressure decreasing may delay compared to the timing of the pressure decreasing when the raising processing is not executed. In other words, there is room for improvement in terms of brake feeling.

Accordingly, this invention was made in consideration with the above-mentioned situation and the invention pertains to provide a vehicle brake device which executes a raising processing, making it possible to improve a brake feeling.

Solution to Problem(s)

The vehicle brake device according to the invention includes a regeneration brake device which generates a regeneration braking force and a hydraulic pressure brake device which generates a hydraulic pressure braking force, wherein a cooperative control between the regeneration brake device and the hydraulic pressure brake device is executed so that a sum of the regeneration braking force and the hydraulic pressure braking force follows a required braking force and wherein in a switching processing in which at least a portion of the regeneration braking force is gradually switched over to the hydraulic pressure braking force, in order to suppress a response delay of pressure increasing of an operating fluid, a raising processing is executed for raising a target hydraulic pressure of the operating fluid at a time of starting the pressure increasing of the operating fluid by a predetermined raising amount. The vehicle brake device includes a judging portion which judges whether or not the required braking force or a deceleration is dropping in the cooperative control and a raising amount setting portion which sets a second predetermined pressure which is smaller than a first predetermined pressure which is a raising amount when a judgment result by the judging portion is negative, as a raising amount, when the judgement result by the judging portion is positive, upon an execution of the raising processing.

Effect of Invention

The raising processing can be executable even in a case, for example, when a brake operating member is returned (when the brake operating member is operated to a brake releasing side). In such case, after the pressure increasing control accompanying the raising processing, the control is switched over to the pressure decreasing control. Therefore, the timing of actual pressure decreasing delays, which may generate a disagreement between the deceleration and the brake operation and the brake feeling may be affected. According to the invention, however, the raising amount becomes small when the required braking force or the deceleration is dropping upon execution pf the raising processing. Accordingly, in the raising processing, the timing delay of pressure decreasing derived from the raising processing can be suppressed. In other words, according to the invention, the brake feeling can be improved in a vehicle brake device which executes a raising processing.

BRIEF EXPLANATION OF ATTACHED DRAWINGS

EMBODIMENTS FOR IMPLEMENTING INVENTION

The embodiment of the vehicle brake device associated with the invention adapted to a vehicle will be explained hereinafter with reference to the attached drawings. The drawings show a conceptual scheme for the purpose of explanation.

Figure 1:
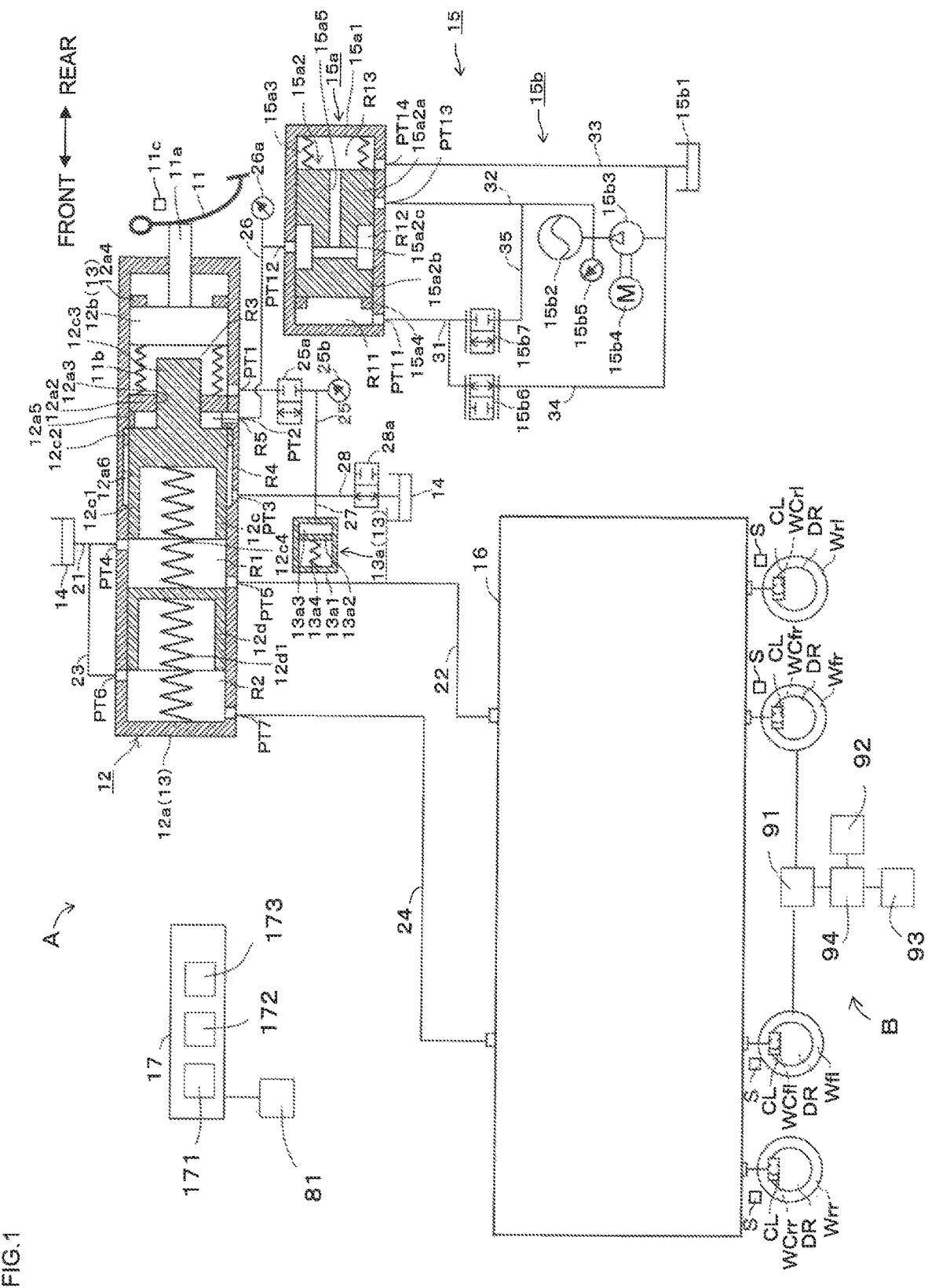
FIG. 1 is a view showing a structure of the vehicle brake device according to an embodiment of the invention.

As shown in FIG. 1, the vehicle is equipped with a hydraulic pressure brake device A which applies hydraulic pressure braking force directly to each vehicle wheel Wfl, Wfr, Wrl and Wrr (in some case, collectively referred to as wheel W, front wheel Wf and rear wheel Wr) to apply braking force to the vehicle. The vehicle of the embodiment is a hybrid vehicle with front wheel drive and includes a regeneration brake device B which generates a regeneration braking force at the front wheel Wf. The regeneration brake device B mainly includes a generator 91 provided at the drive shaft of the front wheel Wf, a hybrid ECU 92, a battery 93 and an inverter 94. The regeneration brake device B is a device which applies the regeneration braking force to the wheel W (in this embodiment, front wheel Wf) by converting the kinetic energy of the vehicle into an electric energy. The structure of the regeneration brake device B is well-known and the detail explanation thereof will be omitted.

(Hydraulic Pressure Brake Device)

As shown in FIG. 1, the hydraulic pressure brake device A includes a brake pedal 11, a master cylinder 12, a stroke simulator portion 13, a reservoir 14, a booster mechanism 15, an actuator 16, a brake ECU 17 and a wheel cylinder WC.

The wheel cylinders WCfl, WCfr, WCrl and WCrr (in some case, collectively referred to as wheel cylinder WC) restrict the rotation of the wheel W and are disposed in the respective calipers CL. The wheel cylinder WC serves as a braking force applying mechanism which applies braking force to the wheel W of the vehicle based on the pressure (brake hydraulic pressure) of the brake fluid (corresponding to "operating fluid") from the actuator 16. When the brake hydraulic pressure is supplied to the wheel cylinder WC, each piston (not shown) in each wheel cylinder WC pushes a pair of brake pads (not shown) which serves as a friction member and squeezes respective disc rotors DR which serve as a rotational member rotating unitary with the wheel W from both sides thereof to thereby restrict the rotation of the rotors DR. It is noted here that in this embodiment, a disc type brake device is used but a drum type brake device may be also applicable.

The brake pedal 11 corresponds to the brake operating member and is connected to the stroke simulator portion 13 and the master cylinder 12 via an operation rod 11*a*. A stroke sensor 11*c* which detects a brake pedal stroke (operating amount; hereinafter referred to also simply as "stroke") indicating a brake operation state by depression of the brake pedal 11 is provided in the vicinity of the brake pedal 11. The stroke sensor 11*c* is connected to the brake ECU 17 and the detection signal (detection result) is outputted to the brake ECU 17.

The master cylinder 12 supplies the actuator 16 with the brake fluid in response to the operating amount of the brake pedal 11 and is formed by a cylinder body 12*a*, an input piston 12*b*, a first master piston 12*c* and a second master piston 12*d*, etc.

The cylinder body 12*a* is formed in a substantially bottomed cylinder shape having a bottom surface closed. A partition wall portion 12*a*2 protruding inwardly in a flange shape is provided on the inner peripheral portion of the cylinder body 12*a*. At the center of the partition wall portion 12*a*2, a through hole 12*a*3 penetrating in the front-rear direction is formed. The cylinder body 12*a* is provided with a first master piston 12*c* and a second master piston 12*d* at an inner peripheral portion thereof at a portion further front side than the partition wall portion 12*a*2. The first master piston 12*c* and the second master piston 12*d* are disposed liquid-tightly movably in an axial direction in the cylinder body 12*a*.

The cylinder body 12*a* is provided with an input piston 12*b* at an inner peripheral portion thereof at a portion further rear side than the partition wall portion 12*a*2. The input piston 12*b* is liquid-tightly movably disposed in an axial direction in the cylinder body 12*a*. The input piston 12*b* slidably moves within the cylinder body 12*a* in response to the operation of the brake pedal 11.

The operating rod 11*a* which is operable in association with the brake pedal 11 operation is connected to the input piston 12*b*. The input piston 12*b* is biased in a direction where the volume of the first hydraulic pressure chamber R3 expands, i.e., in a rearward direction (right direction as viewed in the drawing) by means of a compression spring 11*b*. When the brake pedal 11 is depressed, the operating rod 11*a* advances forward overcoming the biasing force of the compression spring 11*b*. Following this advance movement of the operating rod 11*a*, the input piston 12*b* advances in association with the movement of the operating rod 11*a*. When the depression operation of the brake pedal 11 is released, the input piston 12*b* retreats by the biasing force of the compression spring 11*b* and is brought into contact with a restriction projecting portion 12*a*4 for positioning.

The first master piston 12*c* includes a pressurizing cylindrical portion 12*c*1, a flange portion 12*c*2 and a projecting portion 12*c*3 in order from front side and these portions are formed integrally as a unit. The pressurizing cylindrical portion 12*c*1 is formed in a substantially bottomed cylinder shape having an opening at a front portion thereof and a bottom wall at a rear portion thereof. The pressurizing cylindrical portion 12*c*1 is liquid-tightly movably provided in the inner peripheral surface of the cylinder body 12*a*. A coil spring 12*c*4 which is a biasing member is provided in the inner space of the pressurizing cylindrical portion 12*c*1 between the pressurizing cylindrical portion 12*c*1 and the second master piston 12*d*. The first master piston 12*c* is biased in a rear direction by the coil spring 12*c*4. In other words, the first master piston 12*c* is biased by the coil spring 12*c*4 in a rearward direction and is finally brought into contact with a restriction projecting portion 12*a*5 for positioning. This position is defined to be the initial position (predetermined position) at the time the depression operation of the brake pedal 11 is released.

The flange portion 12*c*2 is formed to have a greater diameter than the diameter of the pressurizing cylindrical portion 12*c*1 and is liquid-tightly and slidably disposed on an inner peripheral surface of a large diameter portion 12*a*6 in the cylinder body 12*a*. The projecting portion 12*c*3 is formed to have a diameter smaller than the diameter of the pressurizing cylindrical portion 12*c*1 and is slidably and liquid-tightly provided on the through hole 12*a*3 of the partition wall portion 12*a*2. The rear end portion of the projecting portion 12*c*3 projects into an inner space of the cylinder body 12*a*, passing through the through hole 12*a*3 and is separated from the inner peripheral surface of the cylinder body 12*a*. The rear end surface of the projecting portion 12*c*3 is separated from the bottom wall of the input piston 12*b* and the separation distance is formed to be variable.

The second master piston 12*d* is arranged in the cylinder body 12*a* at a front side relative to the first master piston 12*c*. The second master piston 12*d* is formed in a substantially bottomed cylinder shape having an opening at a front portion thereof. A coil spring 12*d*1 which serves as a biasing member is disposed in the inner space of the second master piston 12*d* between the second master piston 12*d* and a closed inner bottom surface of the cylinder body 12*a*. The second master piston 12*d* is biased by the coil spring 12*d*1 in a rearward direction. In other words, the second master piston 12*d* is biased by the coil spring 12*d*1 towards a predetermined initial position.

In the master cylinder 12, a first master chamber R1, a second master chamber R2, a first hydraulic pressure chamber R3, a second hydraulic pressure chamber R4 and a servo chamber R5 are formed. In the explanation of the embodiment, the first master chamber R1 and the second master chamber R2 are collectively referred to as the master chamber R1, R2 in some cases. The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the actuator 16 via the hydraulic passage 22 which is connected to the port PT5.

The second master chamber R2 is defined by the inner peripheral surface of the cylinder body 12a and the front side of the second master piston 12d. The second master chamber R2 is connected to the reservoir 14 via the hydraulic passage 23 which is connected to the port PT6. Further, the second master chamber R2 is connected to the actuator 16 via the hydraulic passage 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the inner peripheral surface of the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to an output chamber R12 via the hydraulic passage 26 which is connected to the port PT2.

The pressure sensor 26a is a sensor that detects the servo pressure which is supplied to the servo chamber R5 and is connected to the hydraulic passage 26. The pressure sensor 26a sends the detection signal (detection result) to the brake ECU 17. The servo pressure is an actual value of the hydraulic pressure in the servo chamber R5 and hereinafter this pressure is named as the actual servo pressure (corresponding to the "actual hydraulic pressure").

The stroke simulator portion 13 includes the cylinder body 12a, the input piston 12b, the first hydraulic pressure chamber R3 and a stroke simulator 13a which is in fluid communication with the first hydraulic pressure chamber R3. The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection hydraulic passage (not shown).

The stroke simulator 13a generates a stroke (reaction force) which magnitude depends on the operation state of the brake pedal 11. The stroke simulator 13a includes a cylindrical portion 13a1, a piston portion 13a2, a reaction force hydraulic pressure chamber 13a3 and a spring 13a4. The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by this transferring of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b also detects the operation force applied to the brake pedal 11 and is in mutual cooperative relation with the operating amount of the brake pedal 11. The pressure sensor 25b detects the pressure in the second hydraulic pressure chamber R4 when the first electromagnetic valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detection signal (detection result) to the brake ECU 17.

The booster mechanism 15 generates a servo pressure in response to the operating amount of the brake pedal 11. The booster mechanism 15 is a hydraulic pressure generating device which outputs an output pressure (in the embodiment, the servo pressure) by an operation of an inputted input pressure (in the embodiment, the pilot pressure) and this hydraulic pressure generating device exhibits an output pressure response delay relative to the input pressure at the time of starting pressure increasing operation or at the time of starting pressure decreasing operation, when the output pressure is intended to be increased or decreased. The booster mechanism 15 includes a regulator 15a and a pressure supply device 15b.

The regulator 15a is configured to have a cylinder body 15a1 and a spool 15a2 which slides in the cylinder body 15a1. The regulator 15a includes a pilot chamber R11, the output chamber R12 and a third hydraulic pressure chamber R13.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the front end surface of the second large diameter portion 15a2b with the restriction projecting portion 15a4.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectible with the accumulator 15b2 via the hydraulic passage 32 which is connected to the port PT13.

The third hydraulic pressure chamber R13 is defined by the cylinder body 15a1 and the rear end surface of the first large diameter portion 15a2a of the spool 15a2. The third hydraulic pressure chamber R13 is connectible with the reservoir 15b1 via the hydraulic passage 33 which is connected to the port PT14. A spring 15a3, which biases the spool 15a2 in a direction where the volume of the third hydraulic pressure chamber R13 increases, is disposed in the third hydraulic pressure chamber R13.

The spool 15a2 includes the first large diameter portion 15a2a, the second large diameter portion 15a2b and the small diameter portion 15a2c. The first large diameter portion 15a2a and the second large diameter portion 15a2b are configured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the third hydraulic pressure chamber R13 is formed in the spool 15a2.

The pressure supply device 15b also serves as a drive portion which drives the spool 15a2 to move. The pressure supply device 15b includes a reservoir 15b1 which is a low pressure source, an accumulator 15b2 which is a high pressure source that accumulates the brake fluid, a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b includes a pressure sensor 15b5 which detects the pressure of the brake fluid supplied from the accumulator 15b2 and outputs the detected result to the brake ECU 17.

Further, the pressure supply device 15b includes a pressure decreasing valve 15b6 and the pressure increasing valve 15b7. The pressure decreasing valve 15b6 is a normally open type electromagnetic valve which opens in a non-energized state. The flow-rate of the pressure decreasing valve 15b6 is controlled by the instructions from the brake ECU 17. One side of the pressure decreasing valve 15b6 is connected to the pilot chamber R11 via the hydraulic passage 31 and the other side thereof is connected to the reservoir 15b1 via the hydraulic passage 34. The pressure increasing valve 15b7 is a normally closed type electromagnetic valve which closes in a non-energized state. The flow-rate of the pressure increasing valve 15b7 is controlled by the instructions from the brake ECU 17. One side of the pressure increasing valve 15b7 is connected to the pilot chamber R11 via the hydraulic passage 31 and the other side thereof is connected to the accumulator 15b2 via the hydraulic passage 35 and the hydraulic passage 32 which is connected to the hydraulic passage 35.

The operation of the regulator 15a will be explained briefly hereinafter. In the case where the pilot pressure (hydraulic pressure in the pilot chamber R11) is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14. As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13, which had been closed by the spool 15a2, opens. The port PT14 which had been in the open state, is closed by the spool 15a2. The position of the spool 15a2 under this state is defined to be the "pressure increasing position". At this position, the port PT13 and the port PT12 are connected via the output chamber R12.

The pressing force of the front end face of the second large diameter portion 15a2 b of the spool 15a2, and the resultant force of the force corresponding to the servo pressure and the biasing force of the spring 15a3 are balanced, whereby the spool 15a2 is positioned. This position of the spool 15a2 is defined to be the "holding position". At the holding position, the port PT13 and the port PT14 are closed by the spool 15a2.

In the case where the pilot pressure formed by the pressure decreasing valve 15b6 and the pressure increasing valve 15b7 decreases in response to the brake pedal 11 operation, the spool 15a2 in the holding position now moves in a frontward direction by the biasing force of the spring 15a3. Then, the port PT13 which had been in the closed state by the spool 15a2 keeps the closed state. The port PT14 which had been in the closed state is open. The position of the spool 15a2 at this state is defined to be the "pressure decreasing position". Under this state, the port PT14 and the port PT12 are in fluid communication via a communication passage 15a5.

The above explained booster mechanism 15 establishes a pilot pressure in response to a stroke of the brake pedal 11 by the pressure decreasing valve 15b6 and the pressure increasing valve 15b7 and generates a servo pressure which responds to the stroke of the brake pedal 11 by the pilot pressure. The generated servo pressure is supplied to the servo chamber R5 of the master cylinder 12 and the master cylinder 12 supplies the wheel cylinder WC with the master pressure generated in response to the stroke of the brake pedal 11. The pressure decreasing valve 15b6 and the pressure increasing valve 15b7 form a valve portion which adjusts the inflow or outflow of the brake fluid into or out of the servo chamber R5.

The actuator 16 is a device which adjusts the upper stream pressure (the master pressure) and supplies the downstream (wheel cylinder WC) with the adjusted master pressure. The actuator 16 includes a plurality of electromagnetic valves, electric motors and reservoirs (all are not shown). The actuator 16 can execute pressure increasing control, pressure decreasing control and holding control to the wheel cylinder WC based on the master pressure. In the pressure increasing control, the fluid communication is established between the master chamber R1, R2 and the wheel cylinder WC thereby to supply the wheel cylinder WC with the master pressure. In the pressure decreasing control, the fluid communication is established between the wheel cylinder WC and the reservoir (atmospheric pressure) and in the holding control, the wheel cylinder WC is in a sealed state. The actuator 16 has two conduit systems relative to the four wheel cylinders WC and the wheel cylinder WC and the master chamber R1, R2 are connected to the wheel cylinder WC by a so-called X-conduit system or front-rear conduit system. The actuator 16 forms the ABS system (Antilock Brake System) to be able to execute an ABS control (or Antiskid control). The detail structure of the actuator 16 is well-known and the explanation thereof will be omitted. It is also noted that the actuator 16 may be configured to be able to execute an automatic pressurizing control and an electronic stability control in addition to the ABS control.

(Raising Processing)

The raising processing which is executed upon switching processing will be explained hereinafter. The brake ECU (and the hybrid ECU 92) executes a cooperative control between the regeneration brake device B and the hydraulic pressure brake device A so that the sum of the regeneration braking force and the hydraulic pressure braking force follows a required braking force and in the switching processing in which at least a portion of the regeneration braking force is gradually switched over to the hydraulic pressure braking force, in order to suppress a response delay of pressure increasing of the brake fluid executes the raising processing for raising the target hydraulic pressure of the brake fluid at a time of starting the pressure increasing of the operating fluid by a predetermined raising amount. Each ECU 17, 92 is an electronic control unit and includes CPU and Memory, etc. Not shown in the drawing, but the brake ECU 17 is connected to the booster mechanism 15 and the actuator 16 to be capable of giving instructions thereto.

The brake ECU 17 includes a control portion 171, a judging portion 172, a raising amount setting portion 173. The control portion 171 executes mainly the control of hydraulic pressure braking force, the switching processing and the raising processing based on the later explained target hydraulic pressure braking force calculated from the required braking force. The required braking force is the total amount of the braking force to be applied to the wheel W in response to the brake operation by the driver of the vehicle. The control portion 171 determines the required braking force in response to the operation to the brake pedal 11 (stroke and/or depression force) based on, for example, a map, etc.

The control portion 171 sends the required braking force as the "target regeneration braking force" to the hybrid ECU 92. The hybrid ECU 92 exerts the maximum regeneration braking force that can be outputted under the braking force required timing within the target regeneration braking force or less. Then, the hybrid ECU 92 sends the "executable regeneration braking force" which is the regeneration braking force actually outputted, to the brake ECU 17. The executable regeneration braking force depends on the vehicle speed and the state of battery 93. The control portion 171 sets the value that is obtained by subtracting the executable regeneration braking force from the required braking force as the "target hydraulic pressure braking force" and controls the booster mechanism 15 and/or the actuator 16. Explaining in more concrete, the control portion 171 determines the target servo pressure (corresponding to the "target hydraulic pressure") based on the target hydraulic pressure braking force. The control portion 171 controls the pressure decreasing vale 15b6 and the pressure increasing valve 15b7 so that the actual servo pressure becomes close to the target servo pressure. A dead zone is provided in the target servo pressure.

The control portion 171 executes the switching processing in which the braking force is switched from the regeneration braking force over to the hydraulic pressure braking force because of a dropping of executable regeneration braking force caused by for example dropping of the vehicle speed during braking operation (upon low speed braking operation). The switching processing can also be said to be a shifting processing of the brake operation state in which mainly the regeneration braking force is being applied, to the control state in which the hydraulic pressure braking force is increasing.

In the switching processing, the increase of the hydraulic pressure braking force is delayed relative to the target servo pressure due to an existence of the dead zone. In order to increase the hydraulic pressure braking force, the target servo pressure is increased. However, even the target servo pressure is increased, as long as the difference between the target servo pressure and the actual servo pressure exceeds the range of the dead zone, the pressure increasing control by the booster mechanism 15 would not start and the actual servo pressure does not change. To solve this issue, conventionally, the raising processing is executed for raising the target servo pressure at this switching processing timing. The control portion 171 executes the raising processing for raising the target servo pressure by a predetermined raising amount at this switching processing timing.

The control portion 171 executes the switching processing, for example, when the executable regeneration braking force becomes small (change gradient becomes minus value) and when the target hydraulic pressure braking force changes to the increasing side. In other words, the control portion 171 judges whether or not the executable regeneration braking force becomes small and at the same time the target hydraulic pressure braking force changes to the increasing side and determines the timing of execution of the switching processing. The timing of execution of the switching processing is also the timing of execution of the raising processing. The control portion 171 executes the switching processing and the raising processing at the determined timing of execution of the switching processing.

The judging portion 172 judges whether or not the required braking force or the deceleration is dropping in the cooperative control. In other words, the judging portion 172 detects that the required braking force or the deceleration is dropping in the cooperative control. When the brake pedal 11 is returned, the required braking force and the deceleration drops. This can be said that the judging portion 172 is a means for judging whether or not the brake pedal 11 is returned, i.e., a means for detecting that the brake pedal 11 has been returned.

The judging portion 172 of the embodiment judges whether or not the required braking force (this may be said to be an inclination of the required braking force) is dropping and whether or not the deceleration is dropping based on the required braking force which is determined at the control portion 171 and the detection result of the acceleration sensor 81 (or the detection result of the vehicle wheel sensor S). The acceleration sensor 81 is a sensor which is installed in the vehicle and detects the acceleration of the vehicle in the vehicle front/rear direction. The acceleration sensor 81 is arranged, for example, in the brake ECU 17 and other ECUs. It is noted that the judging portion 172 may judge either one of the required braking force and the deceleration as the judgement element.

It is also noted that the required braking force and the deceleration are co-related with the stroke of the brake pedal 11. Accordingly, the judging portion 172 may judge whether or not the stroke is decreasing based on the detection result of the stroke sensor 11c. In the judging portion 172, the detection of the decrease of the required braking force or the decease of the deceleration corresponds substantially to the detection of the decrease of the stroke or the decrease of the returning operation of the brake pedal 11 and therefore the detection conceptually includes such detection. The judging portion 172 sends the judgement result to the raising amount setting portion 173.

The raising amount setting portion 173 sets the second predetermined pressure which is smaller than the first predetermined pressure which is the raising amount when the judgement result of the judging portion 172 is negative as the raising amount, when the judgement result of the judgement portion 172 is positive upon execution of the raising processing. In other words, the raising amount setting portion 173 sets the second predetermined pressure which is smaller than the first predetermined pressure which is the raising amount in the case when the required braking force or the deceleration is judged to be not dropping (except a case where the judgement is not available) by the judging portion 172 as the raising amount, when the required braking force or the deceleration is judged to be dropping by the judging portion 172 upon execution of the raising processing. According to the embodiment, the raising amount setting portion 173 changes the raising amount from the first predetermined pressure set in advance to the second predetermined pressure when the judgement result of the judging portion 172 is that "the required braking force or the deceleration is dropping" at the execution timing of the raising processing. The second predetermined pressure is set to the value which is equal to or more than zero and less than the first predetermined pressure. (0<=second predetermined pressure <first predetermined pressure).

According to the embodiment, the second predetermined pressure is set to be zero. In other words, the control portion 171 substantially does not execute the raising processing in the case when the judging portion 172 judges that "the required braking force or the deceleration is dropping" upon execution of the raising processing. This is because the raising amount is changed to zero amount in this case. It is noted that as shown in this embodiment, when the judging portion 172 is continuously judging (judgement is made every predetermined period), the changing (setting) of the raising amount by the raising amount setting portion 173 may be executed before the execution timing of the raising processing and also may change the raising amount cooperative with the judgment result of the judging portion 172. Further, the second predetermined pressure may be set, for example, to the value of one-half or one-third, etc. of the first predetermined pressure.

Figure 2:
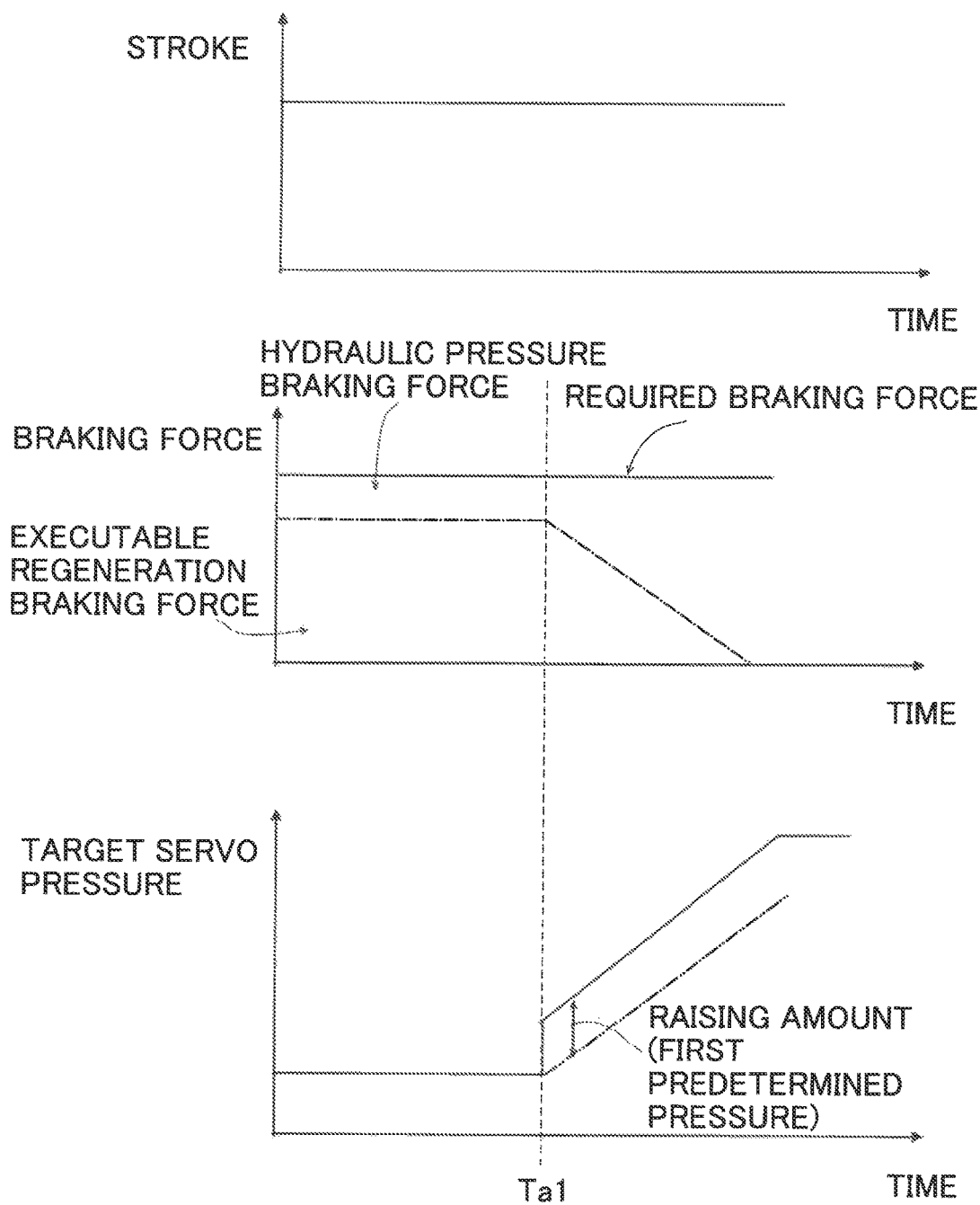
FIG. 2 is a time chart explaining the raising processing of the embodiment.

Hereinafter, the raising processing of the embodiment will be explained raising an example thereof. As shown in FIG. 2, the raising processing under the situation that the brake pedal 11 is not returned, the target servo pressure is raised by the amount of the first predetermined pressure at the execution timing Ta1 of the switching processing. In this situation, the stroke is maintained constant and the required braking force is also maintained constant. At the timing Ta1, the executable regeneration braking force starts decreasing and at the same time the hydraulic pressure braking force (target hydraulic pressure braking force) starts increasing. At this timing the control portion 171 judges that it is the timing of execution of the switching processing. The control portion 171 starts execution of the switching processing and at the same time raises the target servo pressure by the first predetermined pressure which is set in advance. The control portion 171 executes the hydraulic pressure control by the target servo pressure which is constantly raised by the first predetermined pressure, while such switching processing.

Figure 3:
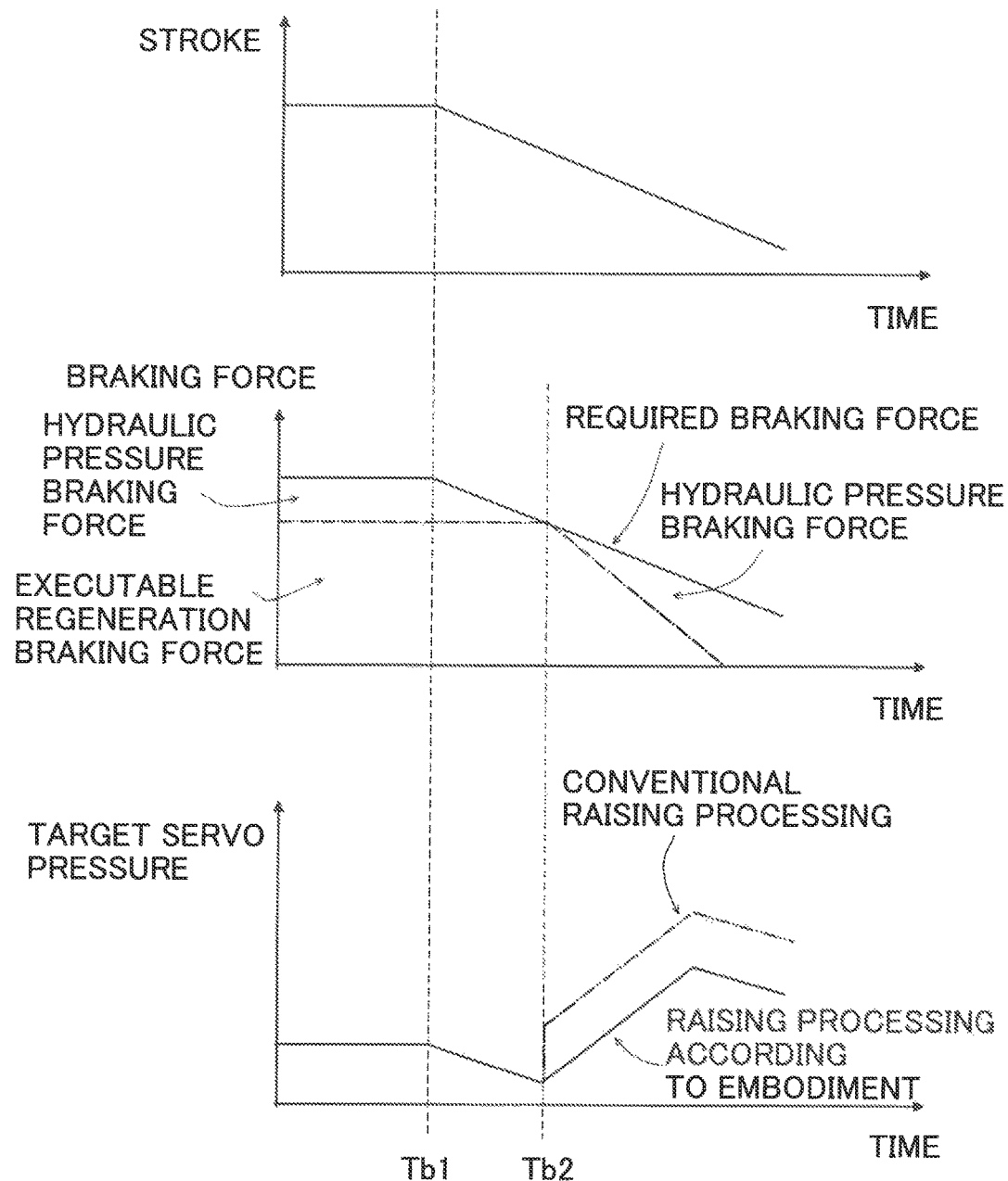
FIG. 3 is a time chart explaining the raising processing of the embodiment.

To the above situation, the raising processing under the situation that the brake pedal 11 has been returned is executed as shown in FIG. 3. First, at the timing Tb1, the brake pedal 11 starts releasing and thereafter, as the decrease of the stroke, the required braking force is decreased. The hydraulic pressure braking force drops keeping the executable regeneration braking force to be constant. In other words, the target hydraulic pressure braking force drops due to the decrease of the required braking force and accordingly, the target servo pressure drops. Then, as the decrease of the vehicle speed, the executable regeneration braking force starts dropping at the timing Tb2. Under this situation, the difference between the required braking force and the executable regeneration braking force increases due to the drop of the executable regeneration braking force. Thus, at the timing Tb2, the control portion 171 starts execution of switching processing.

At the timing Tb1 and thereafter (at least at the timing Tb2), the judging portion 172 judges that the required braking force is dropping. Then, the raising amount setting portion 173 sets the raising amount to the second predetermined pressure (i.e., zero). In other words, the raising amount of the raising processing which is executed by the control portion 171 is set to the second predetermined pressure at the timing Tb2. The control portion 171 executes the hydraulic pressure control by the target servo pressure which is constantly raised by the second predetermined pressure, while such switching processing.

Figure 4:
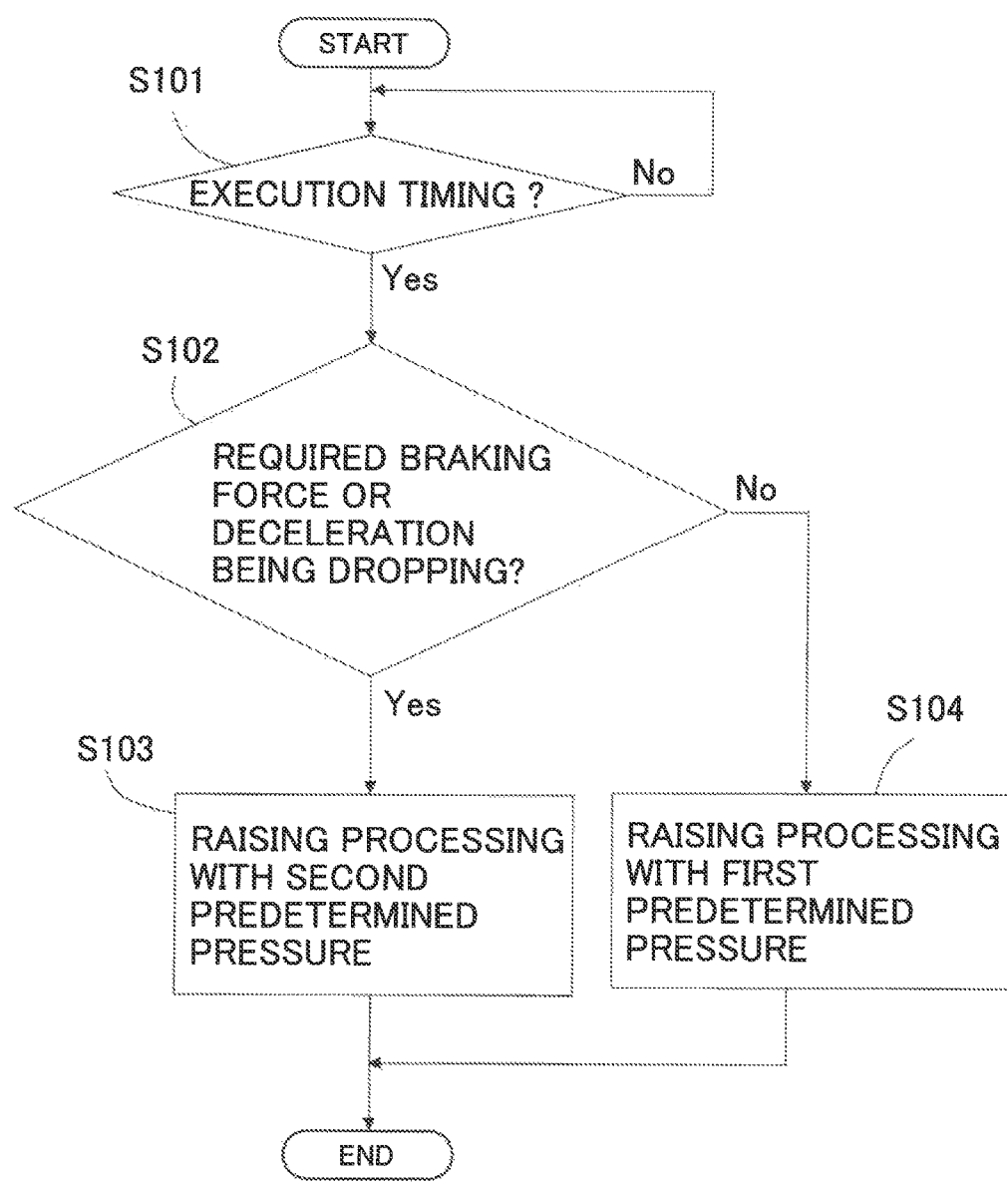
FIG. 4 is a flowchart explaining the raising processing of the embodiment.

The process flow of the raising processing according to the embodiment will be briefly explained hereinafter raising an example. As shown in FIG. 4, the control portion 171 judges whether or not the current state satisfies the condition of execution timing of the switching processing and raising processing (S101). When the control portion 171 judges that "the current state is the execution timing", (S101: Yes), the raising amount setting portion 173 confirms the judgement result of the judging portion 172 (S102). When the judging portion 172 judges that "the required braking force or the deceleration is dropping" (the judgement result is positive) (S102: Yes), the raising amount setting portion 173 sets the raising amount to the second predetermined pressure and the control portion 171 executes the raising processing (S103). On the other hand, when the judging portion 172 does not judge that "the required braking force or the deceleration is dropping" (the judgement result is negative), i.e., when the required braking force and the deceleration is constant or increasing (S102: No), the raising amount setting portion 173 sets the raising amount to the first predetermined pressure and the control portion 171 executes the raising processing (S104).

According to the embodiment, when the brake pedal 11 is returned, the raising amount of the raising processing at the switching processing is changed to a smaller value. Thus, under the situation that the pressure decreasing control is executed in the switching processing, a sudden increase of pressure increasing inclination can be suppressed and a delay of actual pressure decreasing timing upon switching the control over to the pressure decreasing can be suppressed. The switching processing under the situation that brake pedal 11 is released, the delay of starting the pressure decreasing has an influence on the brake feeling more than the responsiveness of pressure increasing.

Figure 5:
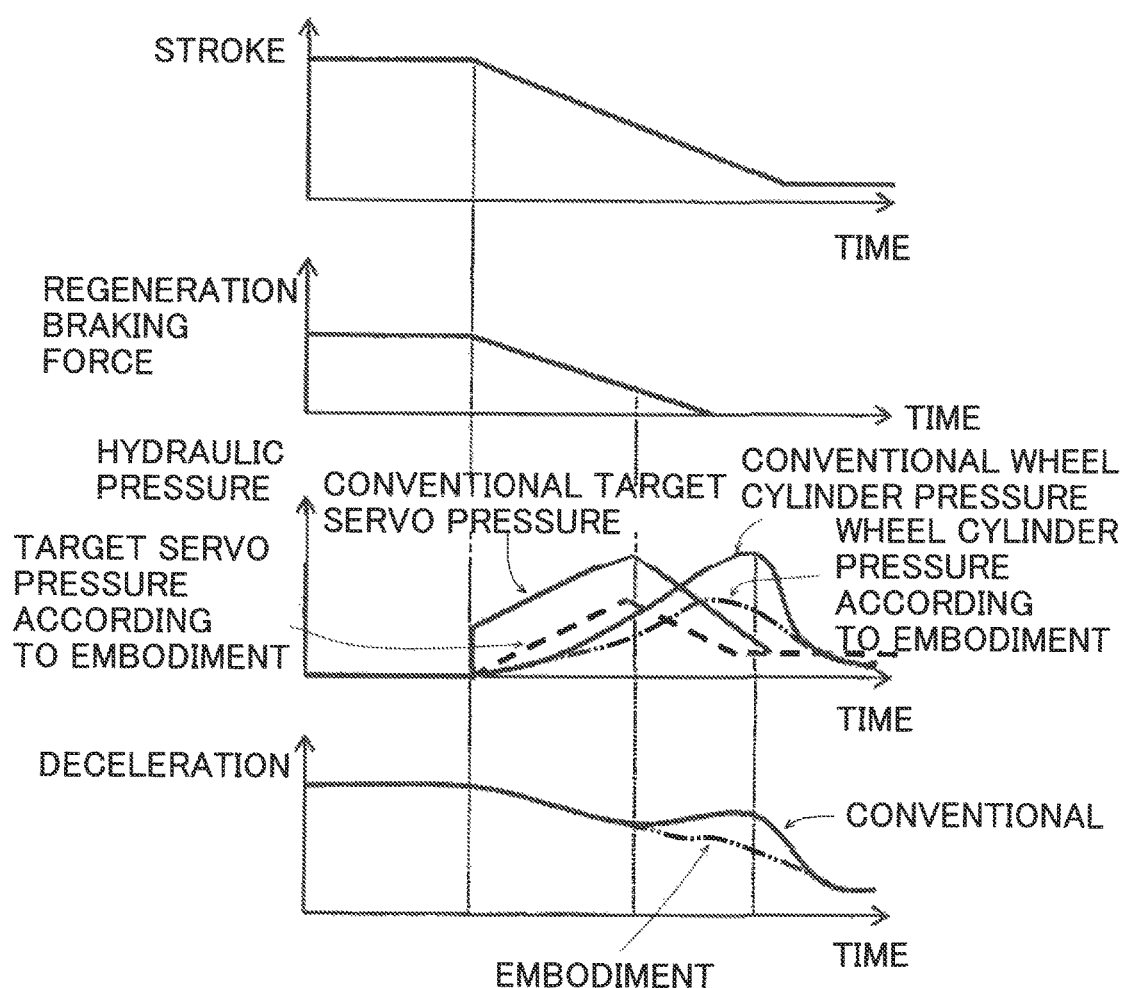
FIG. 5 is a time chart explaining the raising processing of the embodiment.

For example, as shown in FIG. 5, when the raising amount is reduced (See the broken line in the hydraulic pressure graph), compared to the case where no reduction of the raising amount (See solid line in the hydraulic pressure graph), actual wheel cylinder pressure reduction starts earlier (See two-dot line in the hydraulic pressure graph). This can improve a bad connection issue between the reduction of the regeneration braking force and the increase/decrease of the hydraulic pressure braking force which may possibly occur when the regeneration braking force becomes zero to thereby realize deceleration in response to the brake operation. Further, by suppressing the timing delay of the pressure decreasing, a steep change of the pressure decreasing inclination after the start of the pressure decreasing can be suppressed. In other words, according to the embodiment, a sudden change of deceleration can be suppressed.

Thus, according to the embodiment, the brake feeling (and eventually the ride-comfortability) can be improved even during the switching processing when the brake pedal 11 is released. It is also noted that according to the embodiment, the deceleration in response to the required braking force can be achieved to improve the ride-comfortability when the device is applied to a self-driving automobile. In the case of self-driving the required braking force can be determined by requested values obtained by calculation according to the driving situation and from other systems (such as an engine ECU, etc.).

(Modified Embodiment 1 Regarding Setting of Raising Amount) The second predetermined pressure is not limited to the value zero. The second predetermined pressure according to the modified embodiment 1 is set such that the lower the vehicle speed, the smaller the second predetermined pressure is set. In other words, the raising amount setting portion 173, upon setting the raising amount, sets the second predetermined pressure such that the slower the vehicle speed, the smaller the second predetermined pressure is set. In such case, the raising amount setting portion 173 may memorize a map therein which indicates the relationship between the vehicle speed (for example, detection result of the wheel speed sensor S) and the second predetermined pressure. Such relationship between the vehicle speed and the second predetermined pressure may be a linear relationship or stepped relationship. Under the brake pedal 11 being released, the delay of start of deceleration by the raising processing or the influence thereby becomes large as the vehicle speed is low by the raising processing. However, according to the modified embodiment 1, since the raising amount becomes small as the vehicle speed becomes low, an appropriate raising processing in response to the situation can be executed. As the setting of the value, for example, when the vehicle sped is low, the second predetermined pressure may be set to be a half of the first predetermined pressure and when the vehicle speed is extremely low, the second predetermined pressure may be set to be one-fourth of the first predetermined pressure (or, zero).

(Modified Embodiment 2 Regarding Setting of Raising Amount)

The second predetermined pressure according to the modified embodiment 2 is set such that the smaller the required braking force, the smaller the second predetermined pressure is set. In other words, the raising amount setting portion 173, upon setting the raising amount, sets the second predetermined pressure such that the smaller the required braking force, the smaller the second predetermined pressure is set. Similar to the case of the modified embodiment 1, the raising amount setting portion 173 may memorize a map therein which indicates the relationship between the required braking force and the second predetermined pressure. Such relationship between the required braking force and the second predetermined pressure may be a linear relationship or stepped relationship. Under the brake pedal 11 being released, when the required braking force is small, the delay of start of deceleration by the raising processing or the influence thereby has a tendency of becoming large as the required braking force is low by the raising processing. However, according to the modified embodiment 2, since the raising amount becomes small as the required braking force becomes low, an appropriate raising processing in response to the situation can be executed.

(Modified Embodiment 3 Regarding Setting of Raising Amount)

The second predetermined pressure according to the modified embodiment 3 is set such that the larger the dropping ratio of the required braking force, the smaller the second predetermined pressure is set. In other words, the raising amount setting portion 173, upon setting the raising amount, sets the second predetermined pressure such that the larger the dropping ratio of the required braking force, the smaller the second predetermined pressure is set. The dropping ratio of the required braking force can be calculated from the value of the continuous requested braking force. Similar to the case of the modified embodiment 1, the raising amount setting portion 173 may memorize a map therein which indicates the relationship between the dropping ratio of the required braking force and the second predetermined pressure. Such relationship between the dropping ratio of the required braking force and the second predetermined pressure may be a linear relationship or stepped relationship. Under the brake pedal 11 being released, when the dropping ratio of the required braking force is large, the delay of start of deceleration by the raising processing or the influence thereby has a tendency of becoming large as the dropping ratio of the required braking force is large by the raising processing. However, according to the modified embodiment 3, since the raising amount becomes small as the dropping ratio of the required braking force becomes large, an appropriate raising processing in response to the situation can be executed (Modified Embodiment 4 Regarding Setting of Raising Amount)

The second predetermined pressure according to the modified embodiment 4 is set such that the larger the deceleration inclination (inclination of the deceleration), the smaller the second predetermined pressure is set. In other words, the raising amount setting portion 173, upon setting the raising amount, sets the second predetermined pressure such that the larger the deceleration inclination, the smaller the second predetermined pressure is set. It is noted here that the deceleration inclination means that change amount of the deceleration per predetermined time (i.e., change ratio of deceleration) when the deceleration is dropping. The deceleration inclination may be said to be the dropping ratio of the deceleration. Similar to the case of the modified embodiment 1, the raising amount setting portion 173 may memorize a map therein which indicates the relationship between the deceleration inclination and the second predetermined pressure. Such relationship between the deceleration inclination and the second predetermined pressure may be a linear relationship or stepped relationship. Under the brake pedal 11 being released, when the deceleration inclination is large, the delay of start of deceleration by the raising processing or the influence thereby has a tendency of becoming large when the deceleration inclination is large. However, according to the modified embodiment 4, since the raising amount becomes small as the deceleration inclination is large, an appropriate raising processing in response to the situation can be executed.

(Others)

The invention is not limited to the embodiment explained above. For example, the raising amount when the required braking force and the deceleration are constant or increasing (first predetermined pressure), the value is not necessarily fixed to one single value. For example, the value can be variably set depending on the situation. In other words, a plurality of first predetermined pressure values can be set. In such case, the second predetermined pressure is set to be the pressure less than the minimum first predetermined pressure. Further, the switching processing is executed not only at the low speed braking operation but also, for example, may be executed at the side skidding preventing function (vehicle stability control). The present invention can be also applicable to the raising processing in such case. The braking force explained in the description of the invention also includes "brake torque" as a concept and for example, as a concept, controlling braking force also includes controlling brake torque.

REFERENCE SIGNS LIST

11; brake pedal,
12: master cylinder,
12c: first master piston,
12d: second master piston,
15; booster mechanism,
16; actuator,
17; brake ECU,
171; control portion,
172; judging portion,
173; raising amount setting portion,
91: generator,
92: hybrid ECU,
93: battery,
94: inverter,
A; hydraulic pressure brake device,
B: regeneration brake device,
R1: first master chamber,
R2: second master chamber,
R5: servo chamber,
W: vehicle wheel,
WC: wheel cylinder.

The invention claimed is:

1. A vehicle brake device comprising:
a regeneration brake device which generates a regeneration braking force; and
a hydraulic pressure brake device which generates a hydraulic pressure braking force, wherein
the regeneration brake device and the hydraulic pressure brake device are configured to execute a cooperative control so that a sum of the regeneration braking force and the hydraulic pressure braking force follows a required braking force, a switching processing in which at least a portion of the regeneration braking force is gradually switched over to the hydraulic pressure braking force, in order to suppress a response delay of pressure increasing of an operating fluid, and a raising processing for raising a target hydraulic pressure of the operating fluid at a time of starting pressure increasing of the operating fluid by a predetermined raising amount, the vehicle brake device further comprising:
a judging portion which judges whether or not the required braking force or a deceleration is dropping in the cooperative control; and
a raising amount setting portion which sets a second predetermined pressure which is smaller than a first predetermined pressure which is a raising amount when a judgment result by the judging portion is negative, as a raising amount, when the judgement result by the judging portion is positive and when the difference between the required braking force and the executable regeneration braking force is increasing, upon an execution of the raising processing.

2. The vehicle brake device according to claim 1, wherein, the raising amount setting portion, upon setting the raising amount, sets the second predetermined pressure such that the smaller a vehicle speed, the smaller a value of the second predetermined pressure is set.

3. The vehicle brake device according to claim 1, wherein, the raising amount setting portion, upon setting the raising amount, sets the second predetermined pressure such that the smaller the required braking force, the smaller a value of the second predetermined pressure is set.

4. The vehicle brake device according to claim 1, wherein, the raising amount setting portion, upon setting the raising amount, sets the second predetermined pressure such that the higher a dropping ratio of the required braking force, the smaller a value of the second predetermined pressure is set.

5. The vehicle brake device according to claim 1, wherein, the raising amount setting portion, upon setting the raising amount, sets the second predetermined pressure such that the larger an inclination of the deceleration, the smaller a value of the second predetermined pressure is set.

* * * * *